United States Patent [19]

Costa

[11] 4,068,363

[45] Jan. 17, 1978

[54] HAND TOOL FOR MANIPULATING COIL SPRINGS

[76] Inventor: John Costa, 13601 Athania, Silver Spring, Md. 20906

[21] Appl. No.: 735,269

[22] Filed: Oct. 26, 1976

[51] Int. Cl.$^2$ .............................................. B23P 19/04

[52] U.S. Cl. ...................................................... 29/227

[58] Field of Search .................... 29/225, 227; 81/3 R

[56] References Cited

U.S. PATENT DOCUMENTS

| | | | |
|---|---|---|---|
| 1,614,426 | 1/1927 | Des Rosiers | 81/3 R |
| 2,274,981 | 3/1942 | Grubb | 29/227 |
| 3,120,116 | 2/1964 | Burrell | 81/3 R |
| 3,760,656 | 9/1973 | Veach | 81/3 R |

FOREIGN PATENT DOCUMENTS

| | | | |
|---|---|---|---|
| 401,147 | 7/1909 | France | 81/3 R |

*Primary Examiner*—James L. Jones, Jr.
*Attorney, Agent, or Firm*—Schwartz & Weinrieb

[57] ABSTRACT

A hand tool for the manipulation of coil springs includes a handle and a shank portion fixedly secured thereto at one end thereof, the free or other end of the shank being integrally provided with a coil spring hook-type engaging portion disposed perpendicularly to the shank portion such that such components, when viewed together, form, in effect, a substantially L-shaped tool bit. The dimensions of the shank and hook portions, as viewed along three mutually orthogonal axes, is substantially the same and are of such a value as to permit the tool to be inserted and properly disposed within the central coil portions of a coil spring.

4 Claims, 3 Drawing Figures

HAND TOOL FOR MANIPULATING COIL SPRINGS

BACKGROUND OF THE INVENTION

1. Field of the Invention

The present invention relates generally to hand tools, and more particularly to a new and improved hand tool which is especially adaptable for the manipulation of otherwise or normally inaccessible coil springs.

2. Description of the Prior Art

While the prior art is replete with hand tools for ostensibly manipulating coil springs so as to emplace the same in a predetermined position within a structural assembly, or to remove the same therefrom, such prior art devices are not, in fact, properly structured so as to facilitate accessibility to coil springs within certain structural assemblies.

More particularly, within conventional automotive headlight assemblies, the distance between the headlight and the socket therefor is quite narrow and in addition, the ends of the springs themselves for holding the lamp assemblies within the sockets, are not always accessible, or even visible. Consequently, a hand tool, such as, for example, the tool disclosed in U.S. Pat. No. 2,465,030 to Myers, would not in fact be able to be employed under such conditions as such tool is especially designed, and can only be used for grasping the hooked end portions of the coil springs. As the head portion of the tool shank has the configuration of a flat blade wherein the width of the blade portion is considerably larger, or more particularly, several times greater, than the spacing between the individual coils of the springs, such a tool could not be inserted between the coils of the springs and subsequently manipulated in the predeterminedly disclosed manner so as to in fact accomplish the removal or insertion of coil springs within the aforenoted type of structural assembly.

SUMMARY OF THE INVENTION

Accordingly, it is a significant object of the present invention to provide a new and improved hand tool.

Another object of the present invention is to provide a new and improved hand tool which is particularly adaptable for the manipulation of coil springs.

Still another object of the present invention is to provide a new and improved hand tool which is particularly adaptable for the manipulation of coil springs within particular structural assemblies.

Yet another object of the present invention is to provide a new and improved hand tool which is particularly adaptable for the manipulation of coil springs within automotive headlight assemblies.

Still yet another object of the present invention is to provide a new and improved hand tool which is particularly adaptable for the manipulation of coil springs which are normally inaccessible.

A further object of the present invention is to provide a new and improved hand tool which is particularly adaptable for the manipulation of normally inaccessible coil springs within automotive headlight assemblies whereby the springs may be manipulated so as to remove and replace the same without the necessity of removing any parts of the headlight assembly or the assembly in its entirety, thereby requiring time-consuming and costly realignment of the headlights after replacement within said assembly.

A yet further object of the present invention is to provide a new and improved hand tool which is able to be fabricated of readily available materials and which is economical to produce.

A still further object of the present invention is to provide a new and improved hand tool which is simple in design and therefore is able to be mass produced.

A still yet further object of the present invention is to provide a new and improved hand tool which is particularly adaptable for the manipulation of automotive headlight assembly coil springs, and which is easy to use, whereby the time required for repairing, replacing, or adjusting the headlight assemblies, or parts thereof, is substantially reduced.

SUMMARY OF THE INVENTION

The foregoing and other objectives are achieved in accordance with the present invention through the provision of a hand tool which includes a handle and a shank portion fixedly secured thereto at one end thereof, the free or other end of the shank being integrally provided with a coil spring hook-type engaging portion disposed perpendicularly to the primary shank portion such that such components, when viewed together, form, in fact, a substantially L-shaped tool bit. The dimensions of the shank and hook portion, as viewed along three mutually orthogonal axes, is substantially the same and is of a low value, and consequently, the tool is particularly adaptable for use in manipulating inaccessible coil springs.

BRIEF DESCRIPTION OF THE DRAWINGS

Various other objects, features, and attendant advantages of the present invention will be more fully appreciated as the same becomes better understood from the following detailed description when considered in conjunction with the accompanying drawings, in which like reference characters designate like or corresponding parts throughout the several views, and wherein.

DETAILED DESCRIPTION OF A PREFERRED EMBODIMENT

Figure 1:
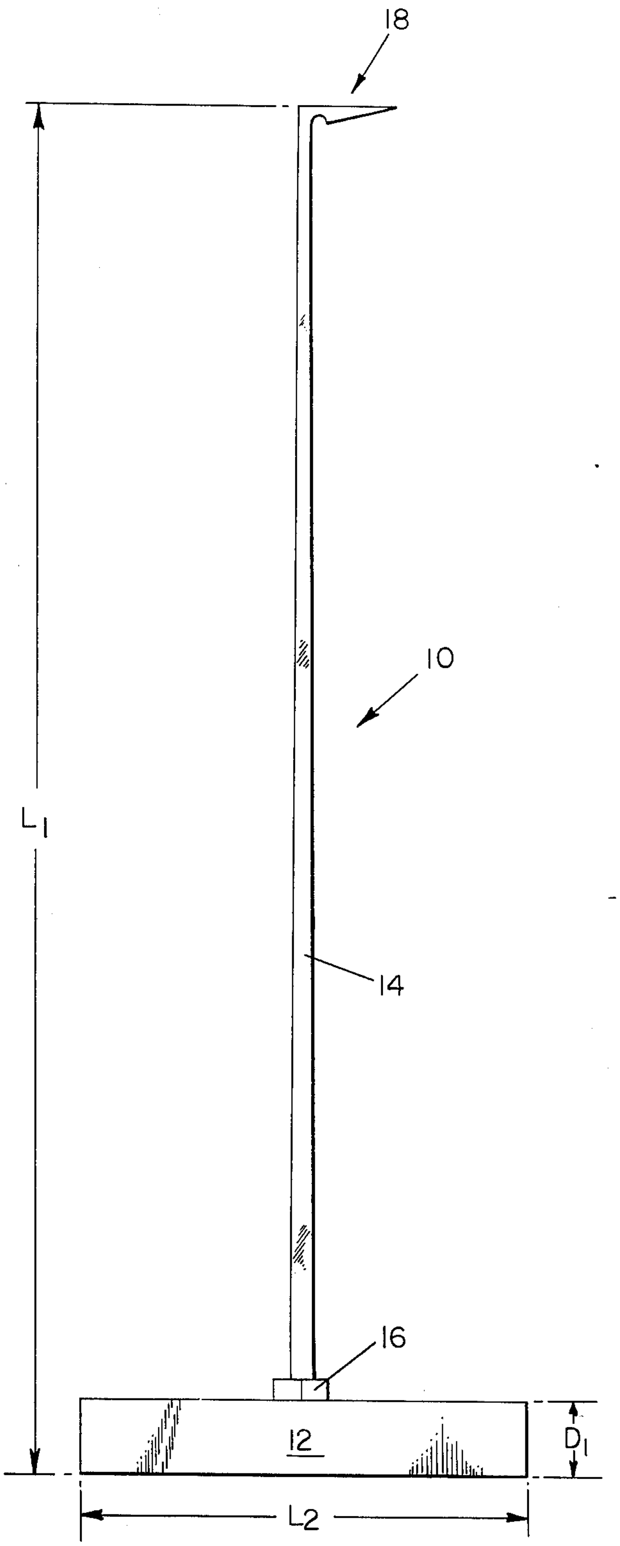
FIG. 1 is a side elevation view of a hand tool for manipulating coil springs constructed in accordance with the present invention and showing its cooperative parts.

Referring now to the drawings, and more particularly to FIG. 1 thereof, there is shown a hand tool, generally indicated by the reference character 10, which is seen to comprise a handle 12 fixedly secured upon one end of a tool shank member 14. The handle 12 preferably has the configuration of an elongated cylinder which facilitates the grasping, holding, and manipulation of the tool during use, and the same may be integrally fabricated with the shank portion 14 through means of an intermediate boss 16, or alternatively, boss 16 may be integrally secured to handle 12 and provided with an internally threaded bore, not shown, which is adapted to receive an externally threaded portion, also not shown, of shank 14.

The opposite or free end of shank 14 is provided with a hooked portion, generally indicated by the reference character 18, which is integrally fabricated therewith and which extends perpendicularly therefrom so as to, in effect, form therewith a substantially L-shaped tool bit, and it is to be noted that the plane of hooked portion 18 may preferably coincide with the longitudinal axis of handle 12, or may, alternatively be preferably disposed perpendicularly or disposed at any other angle in relation thereto.

Figure 2:
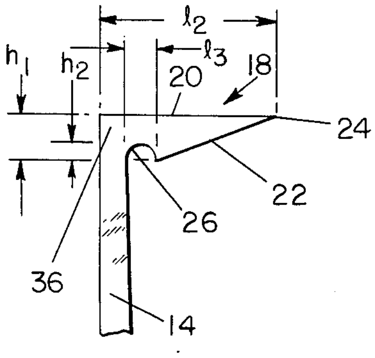
FIG. 2 is an enlarged side elevation view of the hooked portion of the tool of FIG. 1.

With particular reference being made to FIG. 2, it is seen that hooked portion 18 includes a base surface portion 20 and an inclined surface portion 22 which extends away from base portion 20 and towards shank portion 14 upon the side of surface 20 which is closest to handle 12, a pointed tip or wedge portion 24 thereby being defined between surface portions 20 and 22 at the free end of hooked portion 18. The lateral extent of surface portion 22 is somewhat less than that of base surface 20 and it is also seen that surface 22 does not extend up to shank 14. In this manner, shank 14 and surface 22 are able to define therebetween a substantially U-shaped recess 26 which, as more particularly described hereinbelow,serves to house one of the coils of a coil spring when the tool is operatively engaged with the coil spring, the tip portion 24 and inclined surface portion 22 of the tool serving to facilitate the operative engagement of the tool with the coil spring.

As noted hereinabove, the tool of the present invention is particularly adapted, although not limited to, for servicing coil spring components within automotive headlight assemblies, and consequently, as may be appreciated further from FIGS. 1 and 2, an exemplary tool constructed in accordance with the present invention should have an overall length $L_1$ which is at least equal to and preferably greater than the distance conventionally existing between such headlight assembly springs and the exterior surface of the headlamp lens, such therefore preferably being approximately 9½ inches. Similarly, in order to facilitate grasping of handle 12, and the retention of the same within a user's hand under operative conditions, the length $L_2$ of the same should preferably be approximately 4 inches while the diameter $D_1$ thereof may be approximately ½ inch.

Figure 3:
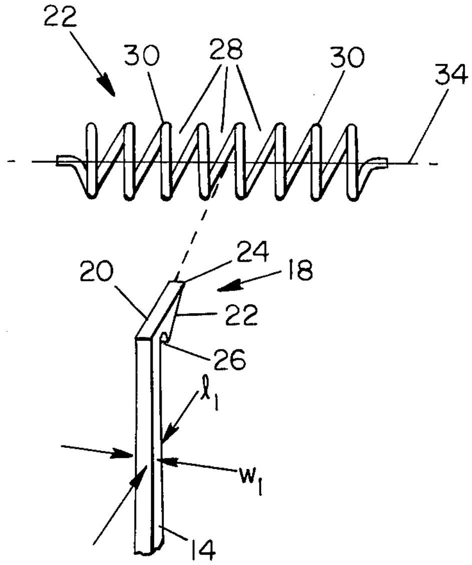
FIG. 3 is a perspective view of the tool of FIG. 1 as the same is being operatively inserted between the coils of a coil spring.

Shank portion may be tapered along the longitudinal extent thereof with the thicker portion being in the vicinity of handle 12 while the thinner portion is in the vicinity of hooked portion 18, and with respect to preferred dimensions of the same, the end portion thereof within the vicinity of hooked portion 18 should have a diameter of approximately 3/32 inch if shank portion 14 is fabricated from round rod stock, or alternatively, as disclosed, if fabricated from rectangular rod stock, then such end portion should have length and width dimensions $l_1$ and $w_1$ of three-thirty-seconds inches respectively, as best seen in FIG. 3. The peak height $h_1$ or maximum depth of the hooked portion 18, as defined between surface portions 20 and 22 is similarly seen to be approximately three-thirty-seconds inches, while the depth $h_2$ of recess 26 may be approximately one-sixteenth inch, and the length $l_2$ of base portion 20 may be within the range of approximately nine-sixteenths inches to thirteen-sixteenths inches, withthe value being preferably eleven-sixteenths inches, while the length $l_3$ of recess 26 is within the range of three-thirty-seconds inches to one-quarter inch, all as best seen in FIG. 2. The entire tool may preferably be fabricated from any one of various, readily available steel materials, such as, for example, chrome-molybdenum steel, stainless, steel, cast steel, or alloys thereof.

In using the device of the present invention, as best seen in FIG. 3, the plane of the hooked portion 18 would initially be disposed parallel to the planes of the spaces 28 defined between successive coils 30 of a conventional coil spring, generally indicated by the reference character 32, and upon insertion of the hooked end portion 18 within one of such spaces 28, the same is subsequently pivoted such that the longitudinal axis of hooked portion 18 is rotated from its original orientation disposed perpendicular to the longitudinal axis 34 of spring 34 to its subsequent orientation wherein such axis is now disposed parallel to axis 34. The inclined surface portion 22, as well as the small dimensional characteristics of the hooked end portion 18 and that portion of shank portion 14 within the vicinity of hooked end portion 18, permits such operation to occur, whereby hooked portion 18, as well as the remote end portion 36 of shank 14, is disposed between the coils 30 of spring 32 and within the interior of the spring, and in addition, inclined portion 22 also serves to move one of the coils 30 of spring 32 upwardly therealong so as to ultimately reside within recessed portion 26.

With such coil portion now disposed within recess 26, and with the longitudinal axis of hooked portion 18 disposed parallel to axis 34 of spring 32, and within the interior of spring 32, manipulation of coil spring 32 is now able to be performed. Likewise, upon completion of the manipulation of spring 32, such as, for example, upon releasing the same from its tensioned mounting within the headlamp assembly, disengagement of tool 10 from spring 32 is readily performed by means of moving shank portion 14 perpendicularly with respect to spring axis 34 so as to disengage the previously retained coil 30 from recess 26. Pivoting of the tool, in a manner substantially reversed from that of the insertion operation, as well as appropriate manipulation and positioning of inclined surface 22 with respect to the coils will then facilitate complete removal of the tool from the coil spring.

Obviously, many modifications and variations of the present invention are possible in light of the above teachings. It is to be understood therefore, that within the scope of the appended claims, the present invention may be practiced otherwise than as specifically described herein. Accordingly,

What is claimed is:

1. A hand tool useful for the assembly and disassembly of a coil spring securing a sealed beam headlight within an automotive headlight assembly wherein the space between said sealed beam and a wall of said assembly is at least approximately 0.125 inches, said tool comprising:

a handle;

shank means secured at one end thereof to said handle;

elongated hook means integrally secured to the other end of said shank means and disposed perpendicular to the longitudinal axis of said shank means so as to form therewith a substantially L-shaped member, said shank means having a thickness of about 3/32 inch in the vicinity of said hook means and said hook means having a length of about 9/16 to 13/16 inch and a thickness of about 3/32 inch, said dimensions permitting the insertion of said hook means and said other end portion of said shank means between the central coils of a coil spring and within the interior of said spring, said dimensions permitting the manipulation and rotation of said shank means within said coil spring and insertion between a sealed headlight and a wall of said assembly which is about 0.125 inch wide; and said hooked means further comprising inclined surface portion means for facilitating said insertion of said hooked portion between said spring coils and within the interior portion of said spring and recess means defined between said inclined portion of said hook and said shank member for receiving one of said coils of said spring upon insertion of said hook portion into the interior of said spring.

2. A hand tool as set forth in claim 1, wherein said hooked means further comprises:

base surface portion intersecting said inclined surface at a location remote from said recess so as to define a wedge section therewith and thereinbetween.

3. A hand tool as set forth in claim 1, wherein:

said recess has a substantially U-shaped configuration.

4. A hand tool as set forth in claim 3, werein the length of said recess is from 3/32 to 1/4 inch.

* * * * *